United States Patent [19]

Friedline

[11] 4,083,645
[45] Apr. 11, 1978

[54] TOOL HOLDER

[75] Inventor: Ernest J. Friedline, Latrobe, Pa.

[73] Assignee: Kennametal Inc., Latrobe, Pa.

[21] Appl. No.: 758,952

[22] Filed: Jan. 13, 1977

[51] Int. Cl.² .............................................. B26D 1/00
[52] U.S. Cl. .................................................. 407/104
[58] Field of Search .......................................... 29/96

[56] References Cited

U.S. PATENT DOCUMENTS

| 3,618,188 | 11/1971 | Faber | 29/96 |
| 3,747,179 | 7/1973 | Lovendahl | 29/96 |

FOREIGN PATENT DOCUMENTS

| 701,900 | 3/1931 | France | 29/96 |

Primary Examiner—Leonidas Vlachos
Attorney, Agent, or Firm—Lawrence R. Burns

[57] ABSTRACT

A tool holder for clamping an insert in an insert receiving pocket of the tool holder wherein the pocket has at least a bottom wall and a side wall for engaging the sides of a cutting insert. A pin member with a head on one end for engaging the top of the insert is inserted through an aperture in the insert and the other or opposite end of the pin engages a hole formed in one of the bottom and side walls of the pocket. Threaded cooperating elements of cam means formed on the other end of the pin and in the hole in one rotated position engage and clamp the insert in the pocket and axial recesses in the threads of each are adapted to receive the threads of the other so as to allow free axial travel of the pin when it is in another rotated position.

1 Claim, 5 Drawing Figures

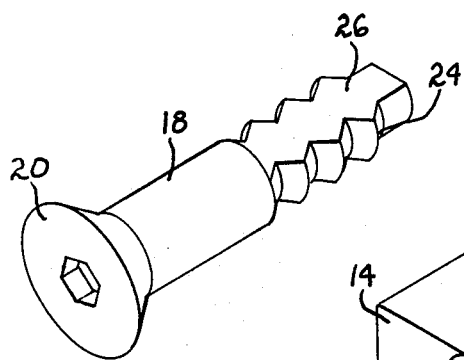
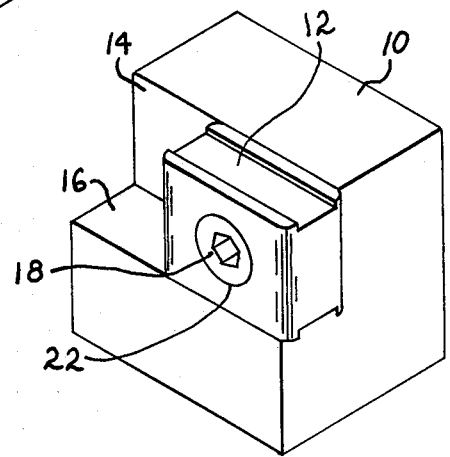
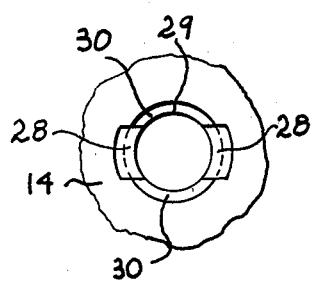
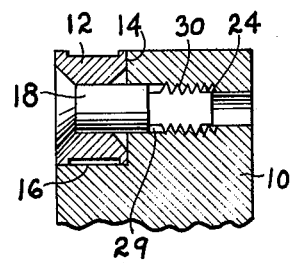
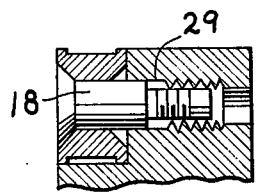

TOOL HOLDER

BACKGROUND OF THE INVENTION

The present invention relates to tool holders having a pocket for removably mounting a cutting insert. In such tool holders, it is desirable to be able to firmly clamp the cutting insert to the tool holder during cutting operations, and when the cutting insert becomes worn, to be able to allow the operator to quickly and efficiently remove and replace the cutting insert.

Various tool holders are known in the prior art, such as, for example, U.S. Pat. Nos. 3,965,553, 3,555,786, 3,354,526, 3,331,116 and various others. Most of the various tool holders of the prior art have heads on the pin for engagement with the insert, with the other end of the pins being fully threaded such that, upon advancement of the threaded pin, bending or tilting of the pin causes the head of the pin to engage the cutting insert. In these examples, when the pin is fully threaded on one end, several rotations of the pin are sometimes required before the insert is clamped properly.

An object of the present invention is to provide a locking pin for an insert receiving tool holder that is simple, efficient, and provides a proper clamping action with a minimum of operator movement.

Another object of the invention is to provide a less expensive, novel and efficient locking arrangement for insert receiving tool holders.

BRIEF SUMMARY OF THE INVENTION

According to the present invention, a tool holder is provided having a pocket for receiving a cutting insert and the pocket has at least a bottom wall and side wall for engaging the cutting insert. The cutting insert is provided with an aperture for receiving a clamping pin which has a head on one end for engagement with preferably the upper side of the cutting insert.

A hole is formed in one of the side and bottom walls of the pocket and is adapted for receiving the other end of the pin that passes through the aperture in the insert. The other end of the pin and the hole have cooperating elements of cam means formed thereon which are operable upon rotation of the pin to cause the pin to clamp the insert firmly in the pocket.

Rotation of the pin in the opposite direction disengages the elements of cam means and permits free axial movement of the pin in the hole. The elements of cam means provided between the other end of the pin and the hole comprise interrupted thread means formed on the pin and on the periphery of the hole.

In one form, the other end of the pin is provided with threads which are interrupted by axial recesses formed along the pin. The interrupted threads and axial recesses are also formed on the periphery of the hole in the tool holder such that the pin may be inserted in the hole with the recesses of one of the elements aligned with the interrupted threads of the other element. When in this position, free axial movement allows the pin to seat in a firmly engaged position with the cutting insert. Rotation of the pin element engages the cooperating threads and provides adequate clamping force to hold the insert in place during the cutting operation.

The exact nature of the present invention will become more clearly apparent upon reference to the following detailed specification taken in connection with the accompanying drawings in which:

FIG. 1 is a perspective view of the tool holder according to the present invention.

FIG. 2 is a view of a locking pin element according to the present invention.

FIG. 3 is an end view of a hole for receiving the pin described in FIG. 2 according to the present invention.

FIGS. 4 and 5 are cut away sections showing cooperation of the pin element of FIG. 2 with the hole formation of FIG. 3.

DETAILED DESCRIPTION OF THE INVENTION

Referring to the drawings somewhat more in detail, what is shown in FIG. 1 is a tool holder 10 having a cutting insert 12 mounted thereon in a pocket having side walls 14 and 16. Pin element 18 is shown holding the insert 12 firmly in the pocket and against bottom wall 16 and side wall 14. Shown further in FIG. 1 is aperture 22 in insert 12 which extends through insert 12.

Referring to FIG. 2, the pin member 18 has an enlarged head 20 on one end for engaging similarly configured aperture 22 in insert 12. On the other end of pin member 18 is shown interrupted threads 24 formed on the periphery of pin member 18 and having axial recesses 26 extending along pin 18.

What is shown in FIG. 3 is a hole 29 formed in one of the bottom and/or side walls of tool holder 10 and having axial recesses 28 formed along the length of the hole and, further, having interrupted threads 30 formed in the hole formation of tool holder 12.

Referring now to FIG. 4, what is shown therein is pin member 18 being inserted into hole formation 29 such that the axial recesses of pin 18 are aligned with the interrupted threads 30 of hole 29 and the interrupted threads 24 of pin 18 are aligned with the axial recesses 28 of hole 29. When positioned in the above described manner, a pin 18 is allowed free axial travel in hole 29.

Referring now to FIG. 5, pin 18 has been rotated such that the interrupted threads 24 of pin 18 are now aligned with the interrupted threads 30 of hole 29. When the threads have been engaged in such a manner, the insert 12 is firmly held against the side wall 14 in the bottom wall 16 of the pocket of tool holder 10.

Modifications may be made within the scope of the appended claims.

What is claimed is:

1. In a tool holder having a pocket for receiving a cutting insert, said pocket having at least a bottom wall and side wall for engaging the cutting insert and the insert having an aperture for receiving a clamping pin, said clamping pin having opposing ends with a head on one end, the improvement which comprises; a hole formed in one of the side and bottom walls of said pocket for receiving the opposite end from the head of the pin wherein said opposite end passes through the aperture in the insert, said other end of said pin and said hole having cooperating elements of cam means which comprise threads formed on said pin and on the periphery of said hole and said threaded cam means operable upon in one rotated position of said pin to cause the pin to bring the head thereof into clamping engagement with the insert, and axial recesses in each of said pin and hole interrupting the threads thereon and adapted so that one of said pin and said hole receives the threads on the other so as to permit free axial movement of the pin in the hole in another rotated position of the pin.

* * * * *